United States Patent [19]

Santamaki et al.

[11] Patent Number: 4,855,825
[45] Date of Patent: Aug. 8, 1989

[54] METHOD AND APPARATUS FOR DETECTING THE MOST POWERFULLY CHANGED PICTURE AREAS IN A LIVE VIDEO SIGNAL

[75] Inventors: Harry J. Santamaki; Ilkka O. Korhonen; Pentti O. Haikonen, all of Espoo, Finland

[73] Assignee: Valtion teknillinen tutkimuskeskus, Espoo, Finland

[21] Appl. No.: 138,846

[22] PCT Filed: Dec. 5, 1985

[86] PCT No.: PCT/FI85/00096
§ 371 Date: Sep. 28, 1987
§ 102(e) Date: Sep. 28, 1987

[87] PCT Pub. No.: WO87/03768
PCT Pub. Date: Jun. 18, 1987

[51] Int. Cl.$^4$ .................. H04N 7/04; H04N 7/12
[52] U.S. Cl. ........................... 358/135; 358/136; 358/141
[58] Field of Search .............. 358/136, 141, 133, 135, 358/105

[56] References Cited

U.S. PATENT DOCUMENTS

| | | | |
|---|---|---|---|
| 3,582,546 | 6/1971 | Brown | 358/136 |
| 4,389,672 | 6/1983 | Bowen et al. | 358/133 |
| 4,575,756 | 3/1986 | Furukawa | 358/136 |
| 4,591,908 | 5/1986 | Hiramo | 358/136 |
| 4,698,672 | 10/1987 | Chen et al. | 358/136 |
| 4,717,957 | 1/1988 | Santamaki et al. | 358/136 |

Primary Examiner—James J. Groody
Assistant Examiner—John K. Peng
Attorney, Agent, or Firm—Merchant, Gould, Smith, Edell, Welter & Schmidt

[57] ABSTRACT

The invention relates to a conditional replenishment method and apparatus for detecting the most powerfully changed, and for the human eye most important, picture areas in a video image in order to compress the image into a transmission channel which functions at the rates of narrow bandwidth data connections. The digitized picture information read into the video memory is compared to the already transmitted picture information stored in the reference memory, and the change value (M) between these is compared to the preset change threshold (T). If the change value (M) surpasses the change threshold (T), the picture information of the respective picture area is coded and transmitted, and the corresponding picture information is stored into the reference memory, preparatory to a new comparison. The comparison between the new picture information and the transmitted picture information is carried out so that the change values (M) in each predetermined picture area are calculated by summing, pel by pel, the differences among the new picture and the reference pictures. The change values (M) obtained for each picture area are combined into a change histogram of the whole frame, which histogram contains the change values (M) in order of magnitude. From this change histogram, there is chosen a number defined by a predetermined reference value ($N_c$) of picture areas with the largest change values (M). The change value (M) of the chosen picture area with the smallest change value (M) is set as the change threshold ($T = M_{opt}$).

5 Claims, 3 Drawing Sheets

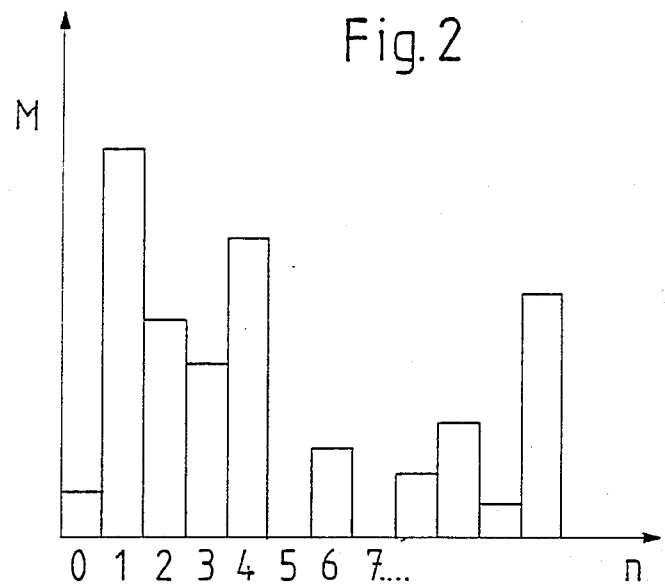
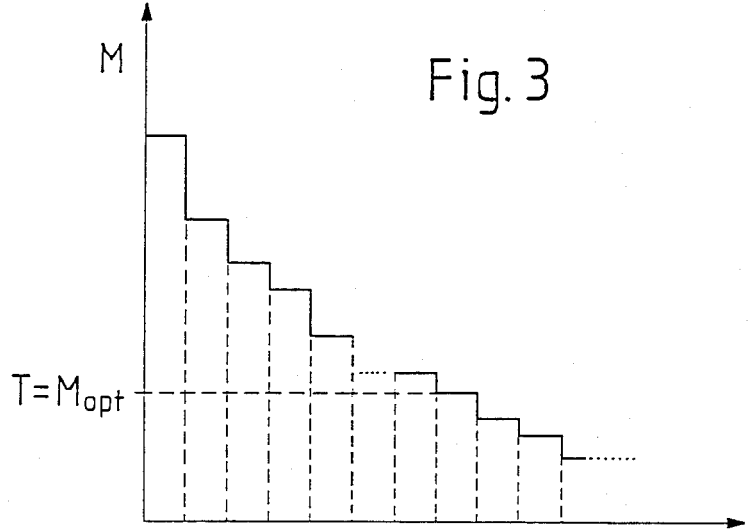

METHOD AND APPARATUS FOR DETECTING THE MOST POWERFULLY CHANGED PICTURE AREAS IN A LIVE VIDEO SIGNAL

The present invention relates to a method for detecting the most powerfully changed and thus for the human eye the most important picture areas in a video image in order to compress the live image into a transmission channel functioning at the rates of narrow bandwidth data connections, in which method the digitized picture information read in to the video memory is compared to the already transferred picture information which is stored in the reference memory, and the difference value, i.e. the change value between these picture data is compared to the present change, threshold, and if the difference value surpasses the chanbe threshold, the picture information of the specific picture elements (pels) and/or area of image in question is coded and transmitted, and the respective picture information is stored into the reference memory preparatory to a new comparison operation.

The invention also relates to an apparatus for realizing the method, the said apparatus comprising at least an analogue-to-digital converter where the video signal is digitized; a vido memory, whereinto the digitized picture information is read; a reference memory, which contains the data of the transmitted picture information; a comparator or equivalent where the contents of the video memory and the reference memory are compared to each other with respect to each corresponding pel and/or area of image; a thresholding unit, where the change value between the respective picture data, received from the comparator, is compared to the change thresholding set for the thresholding unit; a coder, where the picture information contained in the spot and/or area of the image is coded if the change value surpasses the change threshold and which coded picture information is transmitted into the transmission channel; a replenishment unit for the reference memory, via which replenishment unit the transmitted picture information is read into the reference memory.

In the prior art, various transmission arrangements for videoconferencing images have been realized at the trunk rates 2 Mbit/s (Europe), 1.54 Mbit/s (U.S.A.) of digital telephone networks or at their multiple rates from 512 kbit/s upwards, as well as at the rates 64 kbit/s (Europe) or 56 kbit/s (U.S.A.) of the simple and economical subscriber line of the data network. However, the prior art methods have not succeeded in detecting the changed picture areas in a video image so that the most important areas of change were recognized and the best possible quality achieved for the image.

While transmitting a videoconferencing or a teleconferencing image, the basic principle is generally the fact that while the camera remains stable, only that portion of the picture area which represents the object is changed. Thus the picture information concerning an area which represents a stable background must in principle be transmitted only once. By means of this method, the conditional replenishment method, a live video signal can up to certain limit be transmitted along a transmission channel with a considerably narrower bandwidth than is normally required by a standard-shaped video signal. The majority of the known compression methods for a live video signal are based on the said basic principle.

The conditional replenishment method can be optimized and improved by means of several additional methods. The U.S. Pat. No. 3,582,546 introduces a method where the size of the required frame memory can be for instance decreased by employing a system where certain indicator words are chosen per each group of pels of images, the number of bits of each indicator word being lesser than the number of bits of respective pels of images. The scanning of the frame groupwise instead of detecting every pel individually, improves the noise tolerance and the coding efficiency. The size of required picture memory can be decreased, and the image contrast improved, by aid of various histogram modifications connected to the amplitude of the video signal, for example according to the GB patent application No. 2,112,602 and the GB patent publication No. 1,504,675.

The method and apparatus based on the conditional replenishment method functions satisfactorily until the number of changes surpasses the limit allowed by the coding operation and by the channel capacity. In case of overloading, the frame frequency of the video signal can be decreased, on the cost of the liveliness of the image. In that case the change detection threshold can be constant. Another possibility in the said situation is to raise the change detection threshold and to transmit only part of the changed picture areas. Now the problem is how to choose an optimal threshold level for each frame. The chosen threshold value can be adjusted towards the optimum for example by observing the degree of fullness of the transmission buffer, as is suggested in the German patent application No. 2,547,120. The threshold adjustment can also be optimized on the basis of the content of the image for instance so that while comparing small signals, a smaller threshold value is applied than while comparing large signals, as has been suggested in the SE patent publication No. 362,770.

The major drawback of the above described methods is, however, the fact that it is not possible to set the threshold optimally with respect to the image quality. If the threshold is too high, the occurred changes cannot be sufficiently covered while transferring into the receiver (part of the transmission capacity remains unused). If the threshold is too low, requirements concerning the liveliness of the image must be lowered.

The purpose of the present invention is to eliminate the above mentioned drawbacks and to achieve a method and an apparatus whereby the threshold of change can be set with respect to each frame so that an optimal amount of most powerfully changed picture areas will be chosen per each frame. In order to realize this, the method and apparatus of the invention are characterized by the novel features set forth in the appended patent claims.

By employing the method and apparatus of the present invention, several advantages are achieved; let us briefly observe the following. There is sufficient time to transmit all of the chosen picture areas during the respective frame sequence. None of the transmission capacity remains unused. By aid of the adjustment process according to each frame, the best possible quality for the image is achieved.

In the following the invention is explained in detail with reference to the appended drawings, where FIG. 1 illustrates in block diagram a prior art apparatus based on the conditional replenishment method;

FIG. 2 illustrates the changes occurring per each picture area;

FIG. 3 illustrates the distribution of the change values per each picture area, i.e. the change histogram.

Figure 1:
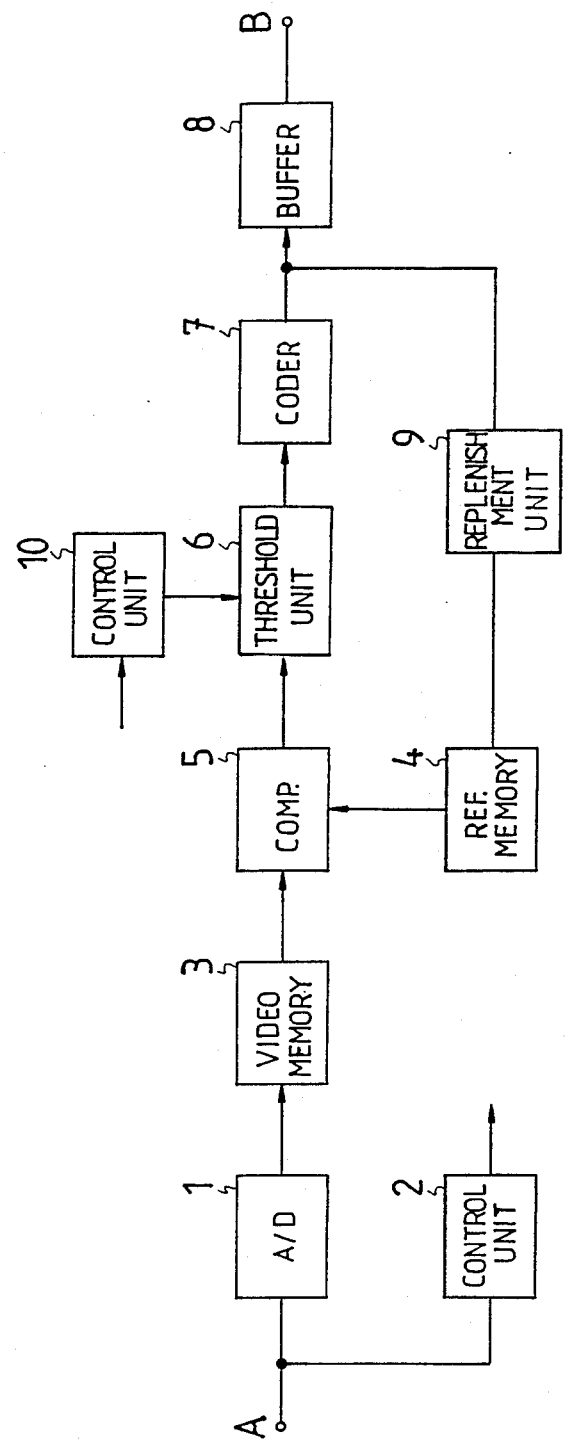

An apparatus employing a prior art conditional replenishment method for detecting the changed picture areas in a live video signal is illustrated in block diagram in FIG. 1. A standard TV or video signal is transferred for instance from the camera via the input A into the analogue-to-digital (A-to-D) converter 1, where the said signal is digitized, and also into the timing and control circuit 2, where the video signal is processed into required timing and control signals. The digitized video signal is read into the picture memory, i.e. the video memory 3.

A digital video image is composed of a raster formed by n×m spots of image, wherein n and m are integrals and n represents the number of lines and the m represents the number of elements into which each line is divided. The picture area in turn is composed of a group of pels of image, which group contains a chosen number of pels. The digitized video signal or video information is formed of the address of the picture area and of the data concerning the pels of image as well as the whole picture area (for instance intensity).

The content of the video memory 3, i.e. the new picture information, and the content of the reference memory 4 are compared in the comparator 5. The reference memory 4 contains the already transmitted picture information. The difference value or change value between the picture data, received from the comparator 5, is compared to the change threshold set in the thresholding unit 6, and if the change value surpasses the preset change threshold, the said pel of image is coded in the coder 7 and transferred via the transmission buffer 8 and the output B into the transmission channel, i.e. the picture information is further transferred to the receiver. The transmitted picture information is transferred via replenishment unit 9 of the reference memory into the reference memory 4, so that the reference memory is updated and always contains the latest transmitted picture information as regards each pel and/or area of image. The threshold value set for the thresholding unit 6 can also be adjusted by means of the control unit 10 of the thresholding unit.

In the method of the invention, the optimal thresholding of change is computed on the basis of the distribution of the change values per each picture area, i.e. on the basis of a histogram. In the said method, the picture areas are numbered, and the respective change value M per each picture area is registered. This procedure is illustrated by means of the column diagram in FIG. 2, where n stands for the number of the picture area a M stands for the magnitude of the change. When the whole frame field has been scanned, the included picture areas are organized in a descending order according to the magnitudes $M_1$, $M_4$, $M_{10}$... of the change, so that a change histogram illustrated in FIG. 3 is formed. The picture areas can also be arranged fo form a change histogram simultaneously as the frame field is scanned. Because a certain standard number, i.e. $N_c$ picture areas, can be transmitted during each frame sequence, it is possible to choose exactly the correct number of the most powerfully changed picture areas in the frame to be transmitted on the basis of the histogram, so that the change value of the chosen picture area with the lowest change value is defined as the optimal change threshold $T=M_{opt}$.

It is advantageous that an exponential weighing is applied in detecting the changed picture areas while computing the change values. The ordinary process of computing the change values M of the picture areas is carried out in a linear fashion, for instance in the area with N×N pels of image:

$$M = \sum_{i=1}^{N} \sum_{j=1}^{N} \Delta K_{ij}, \text{ where} \quad (1)$$

$$\Delta K_{ij} = |K_{ijv} - K_{ijr}|, \text{ and where} \quad (2)$$

l, j=1, 2, 3, ..., N;

$K_{ijv}$=the picture information connected to the new pel ij of image;

$K_{ijr}$=the respective picture informatiion connected to the reference pel ij;

$\Delta K_{ij}$=the absolute value of the difference between the new pel of image and the respective reference pel.

While applying exponential weighing, we get the following equation:

$$M = \sum_{i=1}^{N} \sum_{j=1}^{N} (K_{ijv} - K_{ijr})^x, \quad (3)$$

where x=an even integral.

The application of exponential weighing brings forth the advantage that for a picture area with powerfully changed, individual internal pels of image, a higher change value M is obtained than for an even picture area. Thus for instance the changed contour areas, which are important as regards the quality of the image, obtain a higher change value M and will be transmitted with a higher degree of probability. The application of exponential weighing in connection to the above described histogram (FIG. 3) is useful, because thereby it is possible to affect the mutual order of the picture areas within a change histogram referring to each frame.

Figure 4:
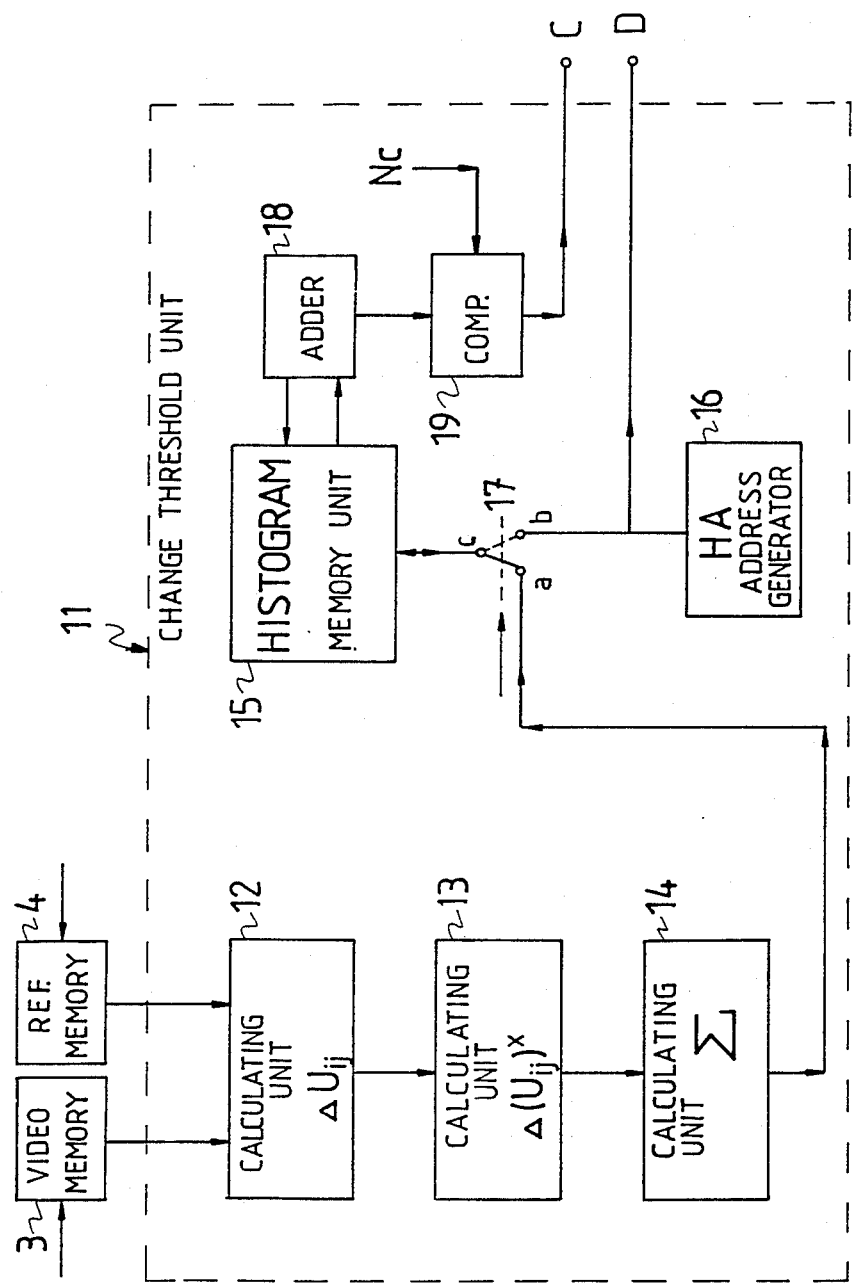
FIG. 4 illustrates in block diagram an apparatus for realizing the method of the present invention.

The method of the invention is below described in detail with reference to a preferred embodiment thereof. FIG. 4 illustrates in block diagram form an apparatus according the present invention, which apparatus is an independent, separate element of the transmitter unit of a video-conferencing device. Let this apparatus be called the change threshold setting unit 11. The task of this apparatus is to calculate the change threshold T, on the basis of which the maximum amount of most powerfully, changed picture areas can be transmitted during the fixed interval in between the frames of the video signal.

Units located outside the change threshold setting unit 11 include the following: the video signal digitizing circuit, the timing and control circuit, the video memory, the reference memory and its replenishment unit as well as a general processor or equivalent coder performing the transmission channel coding (cf. FIG. 1). In addition to the change, threshold setting unit 11, FIG. 4 only illustrates the video memory 3 and the reference memory 4. The change threshold setting unit 11 can be installed where the control unit 10 is located in FIG. 1.

The change threshold setting unit 11 comprises one or several calculating units 12, 13, 14 in order to define the exponentially weighed change values for the picture areas. The calculating units can, at least partly, be realized for example by means of permanently programmed PROM (Programmable Read Only Memory) tables. The change values of the picture areas are fed into the memory unit 15, which is advantageously formed of one or several suitable RAM (Random Access Memory) circuits. The change values are arranged in the histogram table HISTOGRAM either within the same memory unit 15, or recorded into an adjoining memory into which may be realized in a corresponding fashion.

The histogram table comprises a predetermined number of memory locations, for example 500 locations. Each memory location is chosen to represent a specific change value $M_n$ so that the first memory location 0 stands for the largest change value $M_{ns}$, the following standsfor the next largest value etc., so that the memory location 499 stands for the smallest change value $M_{np}$. The difference $\Delta M$ between the various memory locations can be chosen for instance so that the difference between the largest and the smallest expected value is divided by the number of the memory locations. It is naturally clear that $\Delta M$ can also be chosen in some other way, and that the difference between the individual change values does not necessarily have to be constant.

Furthermore, the change threshold setting unit 11 comprises the address generator 16 of the histogram table HA, an electronic switch 17, the inputs a and b whereof are connected to the HA address generator 16 and to the calculating unit 14 respectively, and the output c whereof is connected to the memory unit 15, a cumulative adder 18 and a comparator 19, which adder 18 is connected to the memory unit 15 and which comparator 19 is connected to the adder 18.

The apparatus operated according to the method of the present invention functions as follows for example during one frame sequence of a videoconferencing image.

During the first stage, the histogram is formed. Now the new frame to be coded is read into the video memory 3. The reference memory 4 contains the reference image processed of the preceding frames, by aid of which reference image the changes, i.e. the change values, are computed pel by pel. In the calculating unit 12, i.e. in the first calculating unit, there is calculated the difference between the picture data of the pel ij in the new picture area and the respective pel in the reference picture area, such as the difference between the intensities $U_{ijv}$ and $U_{ijr}$ respectively, the obtained difference being the change value $\Delta U_{ij}$ of the specific pel of image. In the calculation unit 13, i.e. in the second calculating unit, the change value $\Delta U_{ij}$ is exponentially weighed, i.e. the change value is involved to the power x, which is an even integral, for example 2. In the calculating unit 14, i.e. in the third calculating unit, the pels of image belonging to each picture area are scanned and the change values between respective picture data for instance intensities of the spots are combined, i.e. the change values for each picture area are defined:

$$M_n = \sum_{i=1}^{N} \sum_{j=1}^{N} (\Delta U_{ij})^x, \qquad (4)$$

with respect to a picture area formed by $N \times N$ pels of image, when the theoretical maximum value of $n = 1, 2, 3, \ldots N_k$, where $N_k$ is the total number of the picture areas within the frame. The change values $M_n$ of the picture areas are fed into the memory unit 15 via the switch 17, the input a of which switch is then connected to the output c.

The calculated change values $M_n$ of the picture areas are employed as addresses by aid of which the respective memory locations in the histogram table HISTOGRAM are searched. When a change value $M_n$, for example 250.3 corresponds within permitted limits to the address of a certain memory location in the histogram table, for instance 250, the number which may already exist in the said memory location is added by one. The same procedure is continued until all of the areas within the frame are covered. Thus the change values detected in the frame are recorded in the histogram table in a simple fashion.

When the whole frame is covered and the detected change values are recorded in the histogram table, comes the second stage, i.e. the calculating of the change threshold T. Now the position of the switches 17 is adjusted so that the input b is connected to the output c, controlled for instance by a suitable timing signal connected to the termination of the frame. The histogram table HISTOGRAM is then gradually checked, one change value at a time, starting from the first, i.e. the largest change value. The addresses of the histogram table are generated by means of the HA address generator 16, which gives the addresses starting from the largest or the first address and ending up with the smallest, i.e. the last address. By aid of the cumulative adder 18, the cumulative sum S of the covered change values, i.e. the numbers in the histogram table or the amount of picture areas, is gradually calculated. Simultaneously the formation of the said sum S is controlled by means of the comparator 19. The sum S is compared to the reference value $N_c$ preset in the comparator, which value $N_c$ stands for the maximum amount of picture areas which can be transmitted in between the successive frames. The number $N_c$ of the picture areas is predetermined number which depends on the capacity of the transmission channel. When the reference value $N_c$ is surpassed, the operation of the HA address generator 16 is interrupted and a signal is given from the output C of the change threshold setting circuit 11 to an external general processor or equivalent to the effect that the change threshold T, on the basis of which an even number $N_c$ of the most powerfully changed picture areas can be found, is ready to be read at the output D of the memory unit 15. At the same time the histogram table HISTOGRAM is in process of handling the change value $M_{opt}$ corresponds to the change threshold T, and the same is read via the output D in the change threshold setting unit 11.

The third stage is the picking of the changed picture areas, which is a function external to the said setting unit 11. The obtained optimal change threshold $T = M_{opt}$ is recorded for the thresholding unit 6 (FIG. 1). The contents of the video memory 3 and the reference memory 4 are again compared to each other, and the change values M are calculated, which values are then compared to the change threshold $M_{opt}$, and the picture areas corresponding to the surpassing values are coded in the coder 7 and transmitted further, as was already explained in the specification of FIG. 1. In the change threshold setting unit 11, all of the addresses of the histogram table are generated through byb means of the HA address generator 16, whereafter the the histogram table is reset to zero. The input a of the switch 17 is connected to the output c. Thereafter the change threshold setting unit 11 is ready to start processing the next frame.

We claim:

1. A method for detecting the most powerfully changed and for the human eye the most important picture areas in a video image in order to compress a live image into a transmission channel which functions at the rates of narrow bandwidth data connections, comprising:

digitizing a video signal so that a digital video image is formed of pels and a picture area is composed of a group of pels of image;

forming a picture information of the address of the picture area and of the data concerning the pels of image as well as the whole picture;

setting a change threshold (T) in a thresholding unit;

reading a digitized picture information into a video memory;

storing the digitized picture information which is already transmitted into a transmission channel in a reference memory;

comparing the digitized picture information read into the video memory (3) to the already transmitted picture information stored into the reference memory (4) such that the result is a change value (M);

comparing the change value (M) to the present change threshold (T), and when the change value surpasses the change threshold (T), coding and transmitting the picture information of the respective picture area, and storing the corresponding picture information into reference memory (4) in preparation for a new comparison, wherein the comparison between the new picture information and the transmitted picture information is carried out so that the change values in each predetermined picture area are calculated by summing up, pel by pel, the difference ($U_{ij}$) between the picture data of the new picture ($U_{ijv}$) and the reference picture ($U_{ijv}$) and the reference picture ($U_{ijr}$);

combining the change values (M) obtained for each separate picture area into a change histogram of the whole frame, which change histogram contains the change values (M) of the picture areas in order of magnitude;

choosing from this change histogram a number defined by a reference number ($N_c$) of picture areas with the largest change values, which reference number ($N_c$) is predetermined; and setting the change value of the chosen picture area with the smallest change value as the change threshold ($T = M_{opt}$).

2. The method of claim 1, wherein storing the change values (M) of separate picture areas in order of magnitude into a memory (15), in a histogram table;

going through the histogram table starting from the largest change value, and calculating the number of the change values of covered picture areas and comparing the number of change values to the maximum number ($N_c$) of picture areas which can be sent in between the successive frames; and reaching an optimal change threshold ($T = M_{opt}$) when this maximum value ($N_c$) is surpassed, on the basis of which threshold there can be detected those picture areas which are most powerfully changed with respect to the already transmitted image, the number of these picture areas being exactly as much as is possible to transmit in between the successive frames.

3. The method of claim 1 or 2, wherein calculating the change values (M) further comprises exponentially weighing the difference ($U_{ij}$) between the picture data so that the employed exponent (x) is an even integral.

4. An apparatus for detecting the most powerfully changed and for the human eye the most important picture areas in a video image in order to compress a live image into a transmission channel which functions at the rates of narrow bandwidth data connections which apparatus comprises at least an analogue-to-digital converter (1) where a video signal is digitized; a video memory (3), whereinto the digitized picture information is read; a reference memory (4) containing the data of the transmitted picture information; a comparator (5), where the contents of the video memory (3) and the reference memory (4) are compared pel by pel and area by area; a thresholding unit (6), where the change value (M) between the picture data obtained from the comparator is compared to the change threshold (T) set in the thresholding unit (6); a coder (7) where the picture information contained in a pel and area of image is coded in case the change value surpasses the change threshold, which coded picture information is further transferred into the transmission channel; a replenishment unit (1) of the reference memory, through which unit the transmitted picture information is stored into the reference memory (4), wherein an apparatus (11) comprises one or several calculating units (12, 13, 14) in order to calculate the change values (M) for each picture area; at least one memory unit (15) in order to record the change values (M) of the frame in order of magnitude; an address generating unit (16) by aid of which the change values stored in the memory are treated value by value starting from the largest value; a cumulative adder (18) which calculates the cumulative sum (S) of the covered change values, i.e. of the picture areas; a comparator (19), which compares the said sum (S) to the reference value ($N_c$) preset in the comparator, the said reference value being the maximum amount of picture areas that can be transmitted in between successive frames; from the output (C) of which comparator (19) there is given a signal whenever the said sum (S) surpasses the reference value ($N_c$), which signal informs the thresholding unit (6) that the change threshold (T), on the basis of which there can be found a number defined by the reference value ($N_c$) of the most powerfully changed picture areas, is ready to be read at the output (D) of the memory unit (15).

5. The apparatus of claim 4, wherein the calculating units (12, 13, 14) are at least partly realized by means of permanently programmed PROM (Programmed Read Only Memory) tables.

* * * * *

UNITED STATES PATENT AND TRADEMARK OFFICE
CERTIFICATE OF CORRECTION

PATENT NO. : 4,855,825

DATED : August 8, 1989

INVENTOR(S) : Harry J. Santamaki; Ilkka O. Korhonen; Pentti O. Haikonen; Julha V. Leppanen It is certified that error appears in the above-identified patent and that said Letters Patent is hereby corrected as shown below:

On the title page, item [75], add --Julha V. Leppanen of Helsinki, Finland--.

Col. 1, line 16:
   delete the "," (comma) after "change"

Col. 1, line 17:
   delete "chanbe" and insert therefore --change--

Col. 1, line 26:
   delete "vido" and insert therefore --video--

Col. 3, line 55:
   delete "a" and insert therefore --and--

Col. 3, line 61:
   delete "fo" and insert therefore --to--

Col. 5, line 15:
   delete "standsfor" and insert therefore --stands for--

Col. 6, line 65:
   delete "byb" and insert therefore --by--

UNITED STATES PATENT AND TRADEMARK OFFICE
CERTIFICATE OF CORRECTION

PATENT NO. : 4,855,825

DATED : August 8, 1989

INVENTOR(S) : Harry J. Santamaki; Ilkka O. Korhonen; Pentti O. Haikonen; Julha V. Leppanen It is certified that error appears in the above-identified patent and that said Letters Patent is hereby corrected as shown below:

Col. 7, line 26:
   delete "present" and insert therefore --preset--

Signed and Sealed this

Twenty-fourth Day of July, 1990

Attest:

HARRY F. MANBECK, JR.

*Attesting Officer*     *Commissioner of Patents and Trademarks*